W. D. HARRAH, I. M. GIFFORD & E. T. JOHNSTON.
GRAIN BINDER.
No. 102,815. Patented May 10, 1870.
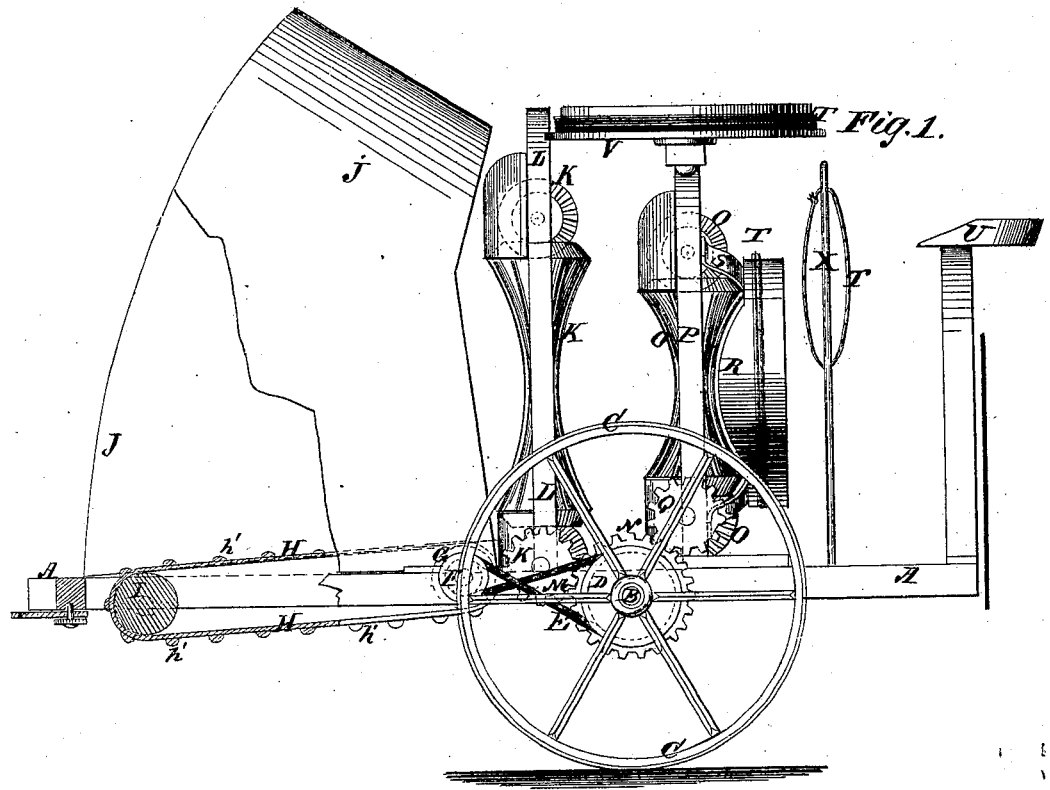
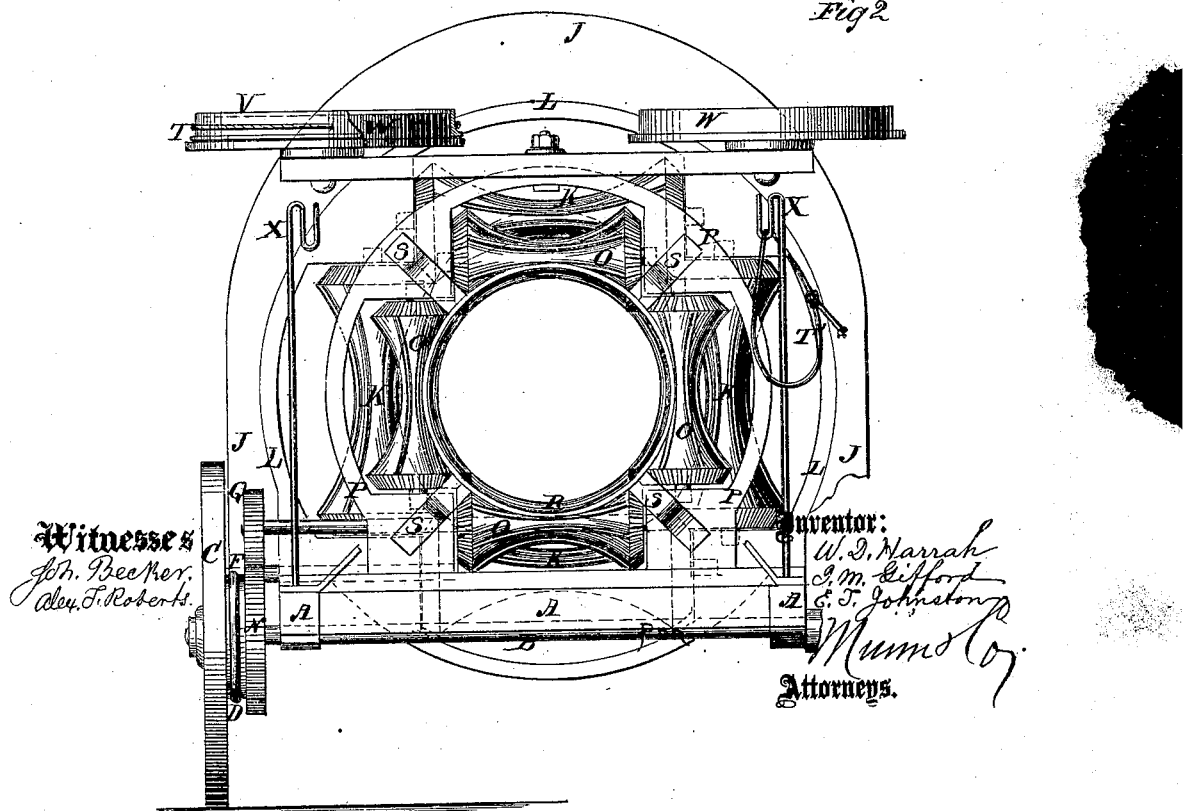

UNITED STATES PATENT OFFICE.

WILLIAM D. HARRAH, IRA M. GIFFORD, AND EDWARD T. JOHNSTON, OF DAVENPORT, IOWA.

IMPROVEMENT IN GRAIN-BINDERS.

Specification forming part of Letters Patent No. 102,815, dated May 10, 1870.

*To all whom it may concern:*

Be it known that we, W. D. HARRAH, IRA M. GIFFORD, and EDWARD T. JOHNSTON, all of Davenport, Scott county, in the State of Iowa, have invented a new and useful Improvement in Grain-Binders; and we do hereby declare that the following is a full, clear, and exact description thereof, which will enable others skilled in the art to make and use the same, reference being had to the accompanying drawings, forming part of this specification, in which—

Figure 1 is a side view of our improved grain-binder, part being broken away to show the construction. Fig. 2 is a rear view of the same, the seat being removed.

Our invention has for its object to furnish an improved machine for forming grain into bundles and binding it as it passes from the reaper, which shall be simple in construction, effective in operation, and convenient in use; and it consists in the construction and combination of the various parts of the machine, as hereinafter more fully described.

A is the frame of the binder, the forward end of which is attached to the rear part of the frame of the reaper in such a position as to receive the grain as it is raked from the platform of the said reaper. The frame A is supported upon the axle B, which revolves in bearings attached to the said frame A, and to the ends of which the wheels C are securely attached, so as to carry the said axle with them in their revolution. To one of the wheels C or to the axle B is attached a pulley, D, around which passes the band E. The band E also passes around the pulley F, attached to the projecting end of the journal of the roller G, which revolves in bearings in the rear part of the platform, formed in the forward part of the frame A. H is an endless apron, which passes around the roller G and around roller, I, the journals of which revolve in bearings attached to the forward part of the same A. The endless apron H may have cross-bars h' attached to it to assist in carrying back the grain as it is received from the reaper. The forward part of the frame A is covered with a tapering hood or bonnet, J, which draws the grain together as it is being carried back, tops foremost, by the endless apron H.

K is a set of four concave rollers, having bevel-gear wheels formed upon their ends, the teeth of which mesh into each other, so that they may all revolve together and in the same direction. The journals of the rollers K revolve in bearings in the vertical frame L, securely attached to the frame A, in such a position that the rollers K may receive the grain from the tapering hood or bonnet J, and draw it farther back, and, at the same time, press it more closely together so that it may enter the next set of rollers. To the projecting end of the journal of the lower roller K is attached a gear-wheel, M, the teeth of which mesh into the teeth of the gear-wheel N attached to the drive-wheel C or axle B, so that the rollers K may be revolved by the advance of the machine.

O is another set of concave rollers, similar to the rollers K, but smaller, connected to each other, and made to revolve together by bevel-gear wheels formed upon their ends, and the teeth of which mesh into each other. The journals of the rollers O revolve in bearings in the vertical frame P, attached to the frame A at such a position in the rear of the frame L that the rollers O may receive the gavel from the rollers K, farther compress it, and carry it back to and force it through the short tube or thimble. To the projecting end of one of the journals of the lower roller O is attached a gear-wheel, Q, the teeth of which mesh into the teeth of the gear-wheel N attached to the drive-wheel C or axle B, as hereinbefore described, so that the second set of rollers may also be revolved by the advance of the machine.

The rollers K and O may be concave or cylindrical, and corrugated, fluted, or plain, as may be desired; but we prefer to make them concave and fluted, as working more satisfactorily.

R is the sheaf-tube or thimble, that receives the gavel from the rear set of rollers O, and which is supported from the frame P by the arms or brackets S, as shown in Figs. 1 and 2. The tube R is made of such a length as to allow a dozen, more or less, of the bands T to be placed upon it, one of which bands T as each gavel passes out of the tube R, is slipped from the tube R upon the said gavel, which band will be tightened by the expansion of the gavel, as it escapes from the tube R, so that the bundle will drop to the ground beneath the operator's seat U, thoroughly bound. The operator's seat U is attached to the rear end of the frame A in such a position that he may conveniently reach the tube R to place the bands upon it, and to slip them from it to the gavel, as it passes out of said tube. V are short tubes or thimbles, made of such a size that they may be slipped upon the tube R, and capable of holding a dozen, more or less, of the bands T, so that when the bands upon the tube R have been exhausted one of the detached tubes V may be slipped upon it, and the bands slipped from the tube V upon the gavel in the same manner as they were slipped from the said tube R. The tubes V when not in use may rest upon the stands W, attached to the frame P in such positions that the operator may conveniently reach them to place bands upon them as he has time, so that one or both of them may be kept filled with bands ready for use.

X are stands attached to the rear parts of the side bars of the frame A in such positions as to be conveniently reached by the operator to remove the bands from them to place them upon the tubes R and V, as required. The stands X should be capable of carrying several hundreds of the bands.

The bands T are all prepared or tied previously, and are taken to the field ready for use.

As it is immaterial how many knots there may be in the bands, old bands when cut from the bundles may be retied and used again.

It sometimes happens that a bundle of grain may pass from the machine smaller than the bands T will bind closely. On this account we prefer to use the looped or slip bands T'. The bands T' are so formed, as shown in Fig. 2, that when a small bundle passes from the machine the attendant, by drawing upon the loose or projecting end of said band, may draw it closely around the bundle.

The end of the band T' has a knot formed upon it, as shown in Fig. 2, in such a position that when the other end is slipped out to said knot the band will be of the same size as the bands T, and may be placed upon the sheaf-tube R and thimbles V in the same manner as the said bands T.

The seat U should be so placed that the weight of the operator will about balance the machine, so that its weight will rest almost entirely upon the axle and wheels B C.

Having thus described our invention, we claim as new and desire to secure by Letters Patent—

1. The tapering bonnet or hood J, endless apron H, and two or more sets of rollers, K O, in combination with each other and with the frame A, axle B, and wheels C, substantially as herein shown and described, and for the purpose set forth.

2. The apron H, rollers K O, combined and arranged with relation to each other, and the axle C B, so as to operate in the manner described, for the purpose specified.

3. The band-tube R, arranged with relation to the rolls K O, bonnet or hood J, and endless apron H, all as shown and described.

4. The detached thimbles or band-tubes V adapted to receive the endless bands T and to be placed upon the stationary band-tube R, substantially as herein shown and described, and for the purpose set forth.

5. The stands W, adapted to receive and hold the thimbles or detached band-tubes V, substantially as herein shown and described, and for the purpose set forth.

WM. D. HARRAH.
IRA M. GIFFORD.
EDWARD T. JOHNSTON.

Witnesses:
D. C. PORTER,
F. O. HORN.